No. 664,847. Patented Jan. 1, 1901.
G. A. FURTICK & L. J. JUMPER.
CULTIVATOR.
(Application filed May 24, 1900.)
(No Model.) 2 Sheets—Sheet 2.

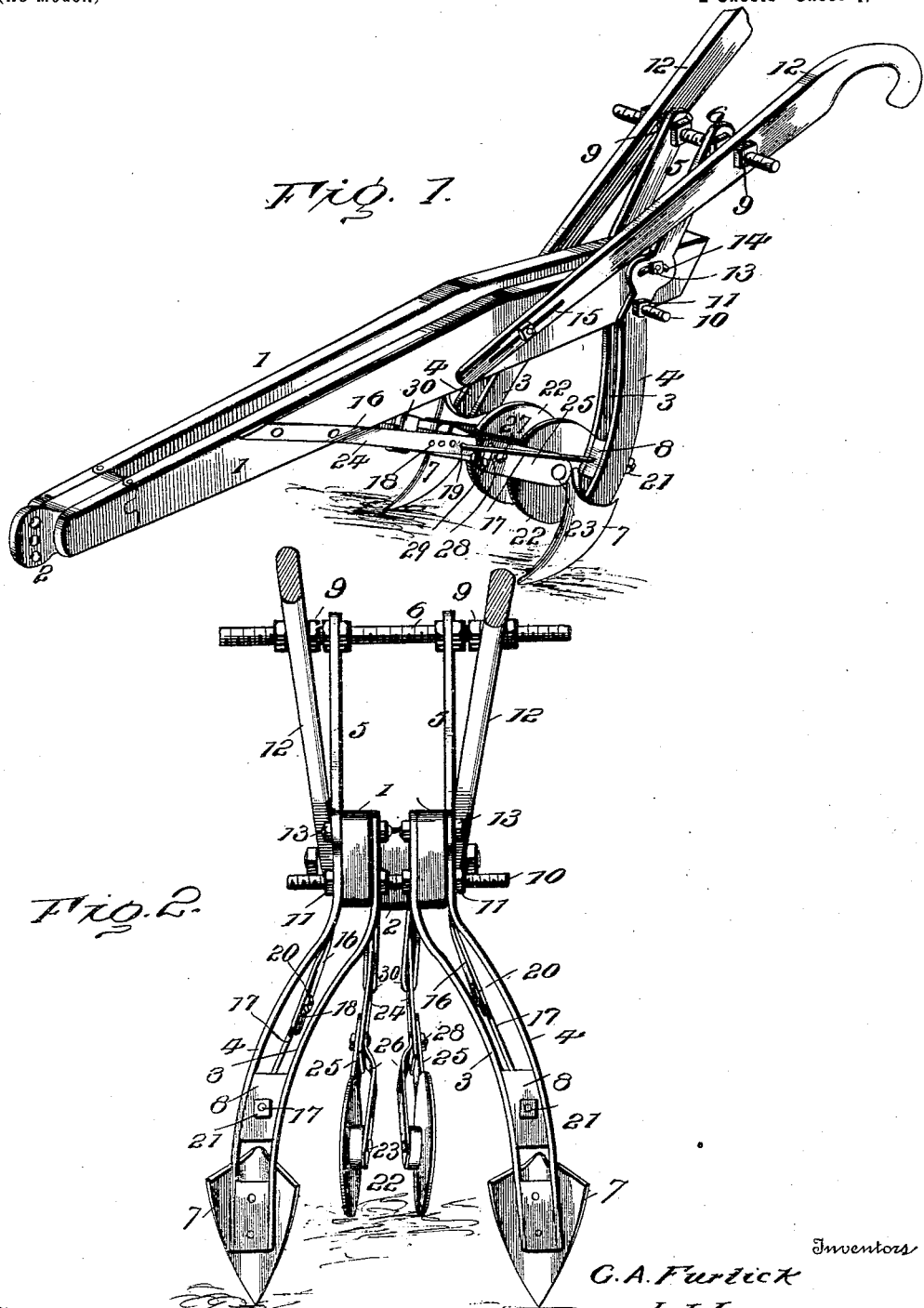

Witnesses
Gladys L. Thompson

Inventors
G. A. Furtick
L. J. Jumper
By Lacey, Attorneys

UNITED STATES PATENT OFFICE.

GRANVILLE A. FURTICK AND LAWRENCE J. JUMPER, OF SWANSEA, SOUTH CAROLINA.

CULTIVATOR.

SPECIFICATION forming part of Letters Patent No. 664,847, dated January 1, 1901.

Application filed May 24, 1900. Serial No. 17,850. (No model.)

*To all whom it may concern:*

Be it known that we, GRANVILLE A. FURTICK and LAWRENCE J. JUMPER, citizens of the United States, residing at Swansea, in the county of Lexington and State of South Carolina, have invented certain new and useful Improvements in Cultivators; and we do hereby declare the following to be a full, clear, and exact description of the invention, such as will enable others skilled in the art to which it appertains to make and use the same.

This invention aims to provide a cultivator of novel construction which will prevent the earth from being thrown upon the young plants and which is adjustable—*i. e.*, capable of having the shovels moved to a greater or less distance apart, according to the nature of the work in hand. Combined with the implement are fenders, mounted for independent rotation, vertically adjustable, and adapted to ride over a grub, stump, boulder, or like unyielding obstruction.

The invention also consists of the novel features, details of construction, and combination of the parts, which hereinafter will be more fully disclosed and finally claimed, and for this purpose and also to acquire a knowledge of the merits of the invention and the structural details of the means whereby the results are attained reference is to be had to the appended description and the drawings hereto attached.

While the essential and characteristic features of the invention are necessarily susceptible of modification, still the preferred embodiment of the invention is illustrated in the accompanying drawings, in which—

Figure 3:
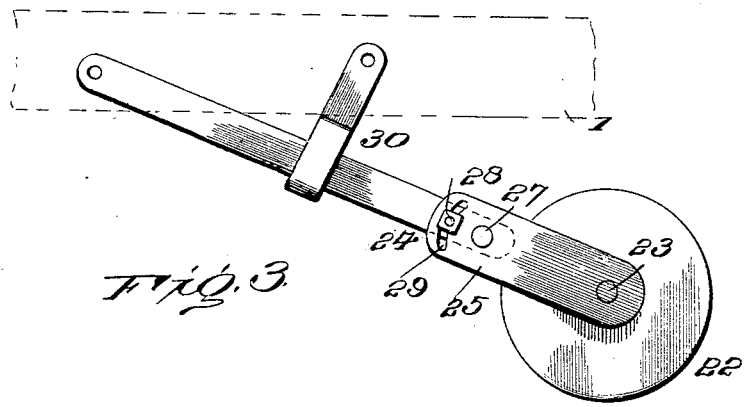
Figure 4:
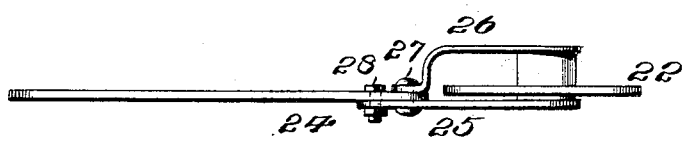
Figure 5:
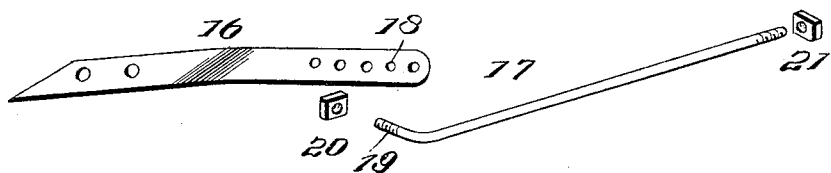
Figure 6:
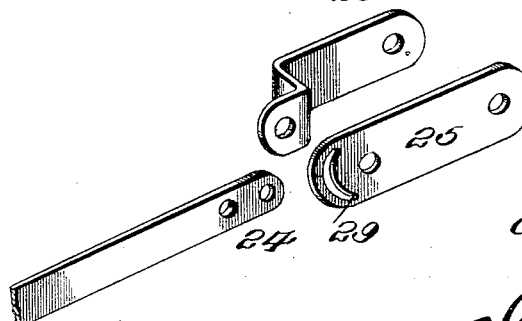

Figure 1 is a perspective view of a cultivator embodying the invention. Fig. 2 is a rear view thereof. Fig. 3 is a side view of a fender and its mountings. Fig. 4 is a top plan view of a fender and its supporting-bar. Fig. 5 is a detail view showing more clearly the construction of the adjustable brace between a beam and the corresponding standard. Fig. 6 is a detail view showing more clearly the joint between the bars carrying the fenders and admitting of a vertical adjustment thereof.

Corresponding and like parts are referred to in the following description and indicated in all the views of the drawings by the same reference characters.

The cultivator in its general construction comprises a beam, companion standards, and rotary fenders, the beam being composed of complementary parts 1, attached at their forward ends to the clevis-block 2 in such a manner as to admit of the rear ends moving laterally to spread the standards more or less, according to the required distance between the cultivator-shovels. A standard is secured to the rear end of each bar 1 of the beam and is composed of an inner element 3 and an outer element 4, the latter being projected above the beam, as shown at 5, to form a support for a transverse rod 6, which is threaded throughout its length. The standards curve laterally in opposite directions and are divergent toward their lower ends, which latter are provided with shovels 7 of any pattern, according to the character of work to be performed. The elements or parts 3 and 4 of the standards are spaced apart and are secured at their upper ends to opposite sides of the parts 1, and blocks 8 are located intermediate of their upper and lower ends for the dual purpose of bracing the parts 3 and 4 and receiving the rear ends of the sectional brace-rods connecting the standards with the beam.

As previously stated, the rear ends of the parts 1 comprising the beam are adapted to be spread more or less to vary the distance between the cultivator-shovels, and this adjustment is effected and the parts secured in an adjusted position by the following means—namely, the transverse rod 6, having pairs of nuts 9 mounted thereon and receiving the upper ends of the extensions 5 between them, and a companion rod 10, threaded throughout its length and passing through openings provided in the parts of the beam and the elements comprising the standards, said rod receiving pairs of nuts 11, adapted to clamp between them the parts 1 and the elements 3 and 4 of the respective standards. By a proper adjustment of the pairs of nuts 9 and 11 the members of the beam and the standards attached thereto can be moved laterally to space the shovels 7 the required distance. The rods 6 and 10 may be of any length, according to the maximum spread of the shovels. The upper rod 6 is longer than the lower rod 10, since it forms a support for the handles 12, which are attached at their lower ends to the parts 1.

It is contemplated to attach the standards to the beam-sections in such a manner as to admit of their turning to vary the pitch of the shovels to cause them to run deep or shallow, and to effect this result the standards are mounted so as to turn upon the rod 10, clamp-bolts 13 being provided to clamp the upper ends of the parts 3 and 4 against opposite sides of the parts 1 when the standards have been adjusted to the required position. Provision is had for adjusting the standards about the rod 10 by means of arcuate slots 14 in the upper end portions of the elements 3 and 4 and through which the respective clamp-bolts 13 pass. It will be understood that when adjusting the standards by turning them upon the rod 10 the upper rod 6 will move relatively forward and rearward in an arcuate path, and in order to make provision for such movement the lower ends of the handles 12 are slotted, as shown at 15, to receive the securing-bolts. The brace between each standard and its respective beam-section consists of a bar 16 and a rod 17, the bar 16 being secured to the part 1 and having a series of openings 18 at its rear end to receive the bent end 19, which is adapted to pass through any one of the openings and is threaded to receive a nut 20, by means of which the parts 16 and 17 are secured when fitted together. The rear end of the rod 17 passes through an opening in the spacing-block 8 and is threaded to receive a nut 21, by means of which slight adjustments of the standard are compensated for in order to preserve the tension upon the brace, larger adjustments being effected by shifting the bent end 19 of the rod 17 to one or the other of the series of openings 18.

Combined with the implement are rotary fenders 22, consisting of disks having hub portions at their inner sides and rotatably mounted upon axles 23, applied to the rear ends of swing-bars pivotally connected at their front ends with the beam-sections. The swing-bars are each composed of a forward bar 24 and a rear bar 25, the latter being adjustably connected with the bar 24, so as to admit of a raising and a lowering of the fender. A brace 26 extends about parallel with the bar 25, and its front end curves inward to the plane of the said bar 25, so as to receive the rear end of the bar 24 between the forward ends of the parts 25 and 26. The axle 23 is supported by the bar 25 and the brace 26. The parts 24, 25, and 26 are pivotally connected by the fastening 27 and a clamp-bolt 28, applied to the rear end of the bar 24 and passes through an arcuate slot 29 of the bar 25 and serves to secure the latter in an adjusted position. A hooked hanger 30 is pivotally attached at its upper end to each beam-section 1, and its lower hooked end receives the forward portion 24 of the swing-bar and normally limits the downward movement of the fender. It will thus be understood that the bar 24 being limited in its downward movement and the bar 25 being relatively adjustable provision is had for moving the fender up or down as required. By having the swing-bar pivotally connected with the beam-section the fender can rise so as to clear a stump, grub, boulder, or like obstruction and prevent injury to this part of the implement.

For cultivating young plants the implement straddles the row, the fenders running upon each side of the plants and preventing the earth being thrown thereon by the cultivator-shovels. After the plants have attained a sturdy growth they are cultivated by running the implement between the rows. Inasmuch as the distance between the rows of plants varies in different localities and according to the nature of the soil, the advantage of having the shovels laterally adjustable will be readily appreciated.

The implement is admirably adapted for cultivating cotton, although it can be used for cultivating rice, corn, or any grain, vegetable, or plant.

Having thus described the invention, what is claimed as new is—

1. In a cultivator, a beam composed of parts or sections connected at their forward ends and laterally adjustable at their rear ends, standards secured to the rear ends of the beam-sections and composed of inner and outer spaced elements, the outer elements being projected vertically, upper and lower transversely-disposed threaded rods passing loosely through openings in the standards and the extensions thereof, the upper rod being longer than the lower rod, means coöperating with the rods for securing the parts in a lateral position, and fenders located intermediate of the standards, as and for the purpose set forth.

2. In a cultivator, a beam composed of laterally-adjustable sections, standards secured to the beam-sections and downwardly divergent on oppositely-curved lines and provided at their lower ends with shovels, and fenders operating in the space formed between the divergent ends of the standards, substantially as set forth.

3. In a cultivator, a beam, a standard secured to the beam and adjustable to vary the pitch of the shovel carried by the standard, an adjustable brace between the standard and beam, and independent means for adjustably connecting the rear portion of the brace with the standard, substantially as set forth.

4. In combination, a beam composed of longitudinal parts or sections adapted to be adjusted laterally at their rear ends, standards applied to the rear ends of the beam-sections and provided at their lower ends with shovels and having vertical extensions, a threaded rod pivotally connecting the standards with the beams and provided with pairs of nuts for securing the parts in an adjusted position, an upper rod supported by the extensions of the standard and threaded to receive pairs of nuts between which the said extensions are clamped, handles mounted upon the ends of the upper transverse rod and having adjustable connection at their lower ends with sections of the beam, substantially as set forth.

5. In a cultivator and in combination with the beam and standard provided with a shovel, a hooked hanger applied to the beam, a swing-bar having pivotal connection with the beam and composed of independent parts, the forward part having a limited downward movement, means for adjustably connecting the rear part of the swing-bar to the front part, and a fender attached to the rear end of the swing-bar, substantially as set forth.

6. The herein-described cultivator comprising a beam composed of spaced longitudinal sections connected at their forward ends, downwardly-divergent standards applied to the rear ends of the beam-section and provided at their lower ends with shovels and having their upper ends extended, a threaded rod pivotally connecting the standards with the beam-sections and provided with pairs of nuts, an upper transversely-disposed rod supported by the extensions of the standards and receiving pairs of nuts, handles supported upon the outer ends of the transverse rod and having adjustable connection at their lower ends with the beam-sections, braces adjustably connecting the sections of the beam with the respective standards, sectional swing-bars, hooked hangers for supporting the forward members of the swing-bars, fenders applied to the rear ends of the swing-bars, and independent means for adjustably connecting the parts comprising the respective swing-bars, as and for the purpose set forth.

In testimony whereof we affix our signatures in presence of two witnesses.

GRANVILLE A. FURTICK. [L. S.]
LAWRENCE J. JUMPER. [L. S.]

Witnesses:
MELTON J. VEESE,
PETER REDNOND.